United States Patent [19]

Krause, deceased

[11] Patent Number: 4,836,582
[45] Date of Patent: Jun. 6, 1989

[54] FLUID COUPLING FOR ENGINE

[75] Inventor: Thomas S. Krause, deceased, late of Howell, Mich., by Barbara A. Krause, executor

[73] Assignee: Barbara A. Krause, Fenton, Mich.

[21] Appl. No.: 639,489

[22] Filed: Aug. 10, 1984

Related U.S. Application Data

[63] Continuation of Ser. No. 416,963, Sep. 13, 1982, abandoned.

[51] Int. Cl.$^4$ ............................................. F16L 41/00
[52] U.S. Cl. .................................. 285/158; 285/179; 285/356; 285/347
[58] Field of Search ............... 285/356, 383, 388, 387, 285/179, 158, 220, 212, 184, DIG. 19, 347

[56] References Cited

U.S. PATENT DOCUMENTS

| | | | |
|---|---|---|---|
| 770,525 | 9/1904 | Hussey | 285/356 X |
| 1,861,314 | 5/1932 | McAndrew | 285/158 X |
| 2,013,732 | 9/1935 | Marvin | 285/356 X |
| 2,480,174 | 8/1949 | Yost | 285/387 X |
| 2,481,404 | 9/1949 | Donner | 285/179 X |
| 2,790,632 | 4/1957 | Mellette | 285/347 X |
| 2,926,935 | 3/1960 | LaMarre | 285/184 |
| 4,133,564 | 1/1979 | Sarson et al. | 285/356 X |
| 4,239,262 | 12/1980 | Krupp et al. | 285/179 X |

FOREIGN PATENT DOCUMENTS

| | | | |
|---|---|---|---|
| 385577 | 3/1965 | Switzerland | 285/158 |
| 913069 | 12/1962 | United Kingdom | 285/158 |
| 1083777 | 9/1967 | United Kingdom | 285/158 |

Primary Examiner—Thomas F. Callaghan
Attorney, Agent, or Firm—Ian C. McLeod

[57] ABSTRACT

A fluid coupling (10) for an engine is described. The coupling includes a housing (21) threaded (22) for connection to the engine with a rotatable conduit means (11) which allows connection of flexible cooling fluid hoses in sealed connection with the housing. The housing can be turned into a corresponding threaded opening in the engine, particularly one located in a position which allows restricted rotational movement of the conduit means. This coupling is particularly adapted for use on heavy diesel engines, but could be adapted to any size engine, such as gasoline or diesel, for application in motor vehicles and the like.

9 Claims, 3 Drawing Sheets

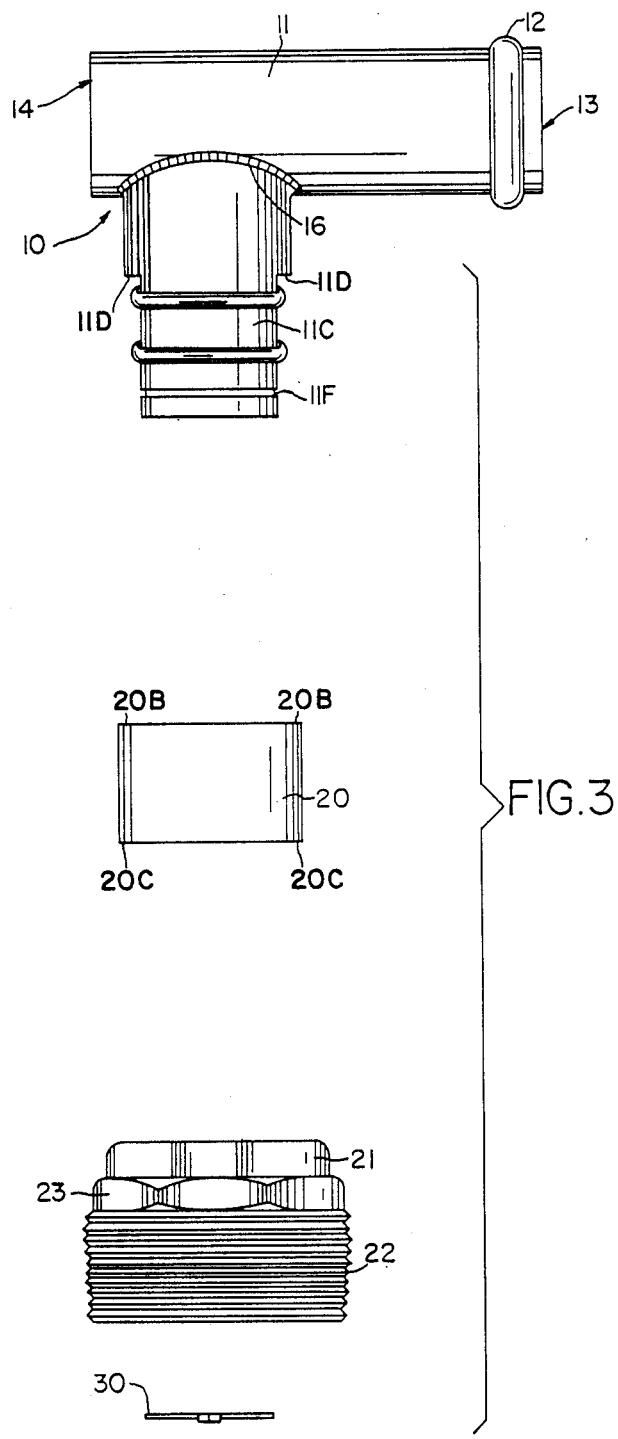

FLUID COUPLING FOR ENGINE

This application is a continuation, of application Ser. No. 06/416,963, filed 09/13/82 and now abandoned.

SUMMARY OF THE INVENTION

The present invention relates to a fluid coupling (10) adapted for use on an engine in a position which normally would prevent a conventional coupling from being threaded into position. The present invention particularly relates to a coupling which has a conduit means (11), which allows connection of flexible cooling fluid hoses, rotatably attached to a housing (21) so as to permit the housing to be threaded (22) into position on an engine without rotating the conduit means.

PRIOR ART

The prior art has provided many different couplings for engines which allow connection of flexible hoses to the engine. The conventional type (and the coupling which the coupling present invention is designed to replace includes a flange rigidly supporting a conduit means for the hose connection which is secured by multiple bolts to a machined flat surface of the engine block. This type of coupling is relatively heavy since it is made of cast or forged metal and it is prone to leakage through gaskets which are usually provided between the coupling and the machined surface of the engine.

Couplings which are threadably connected to the engine can be lighter and more leak proof; however, the cramped area in many motor vehicle engine compartments and many parts on the surface of the engine has prevented such a coupling from being used.

The prior art has provided quick disconnect type rotary fluid couplings; however, these are relatively expensive. Examples are U.S. Pat. Nos. 1,754,639; 2,226,826; 2,429,782; 2,952,482; 3,129,777; 2,642,297; 3,540,760; 3,718,350; 4,133,564; 4,193,616. Such couplings would not be suitable for a permanent fluid connection to an engine because of the risk of disconnection. Rotary fluid couplings are known in other arts but it is not believed that they have been used in engines as far as applicant is aware.

OBJECTS

It is therefore an object of the present invention to provide a coupling (10) which can be threadably (22) connected to a mating threaded opening in a engine at a position where a conventional threaded coupling could not be tightened into position. Further it is an object to provide a coupling which is inexpensive to construct, which is light in weight and which is easy to install. These and other objects will become increasingly apparent by reference to the following description and to the drawings.

IN THE DRAWINGS

FIG. 3 is a separated front view of a similar type of fluid coupling (10), particularly shown in a C snap ring (30) adapted to fit into a corresponding groove (11F) in the conduit means (11) for rotatable mounting on the housing (21).

GENERAL DESCRIPTION

The present invention relates to a fluid coupling for an engine which comprises:
conduit means adapted for connection to flexible hose at one end and having a cylindrical exterior surface at the other end;
connector means having a cylindrical interior surface adapted for a precision rotational fit to the exterior surface of the conduit means, the connector means having an exterior threaded surface adapted to fit a mating threaded opening in an engine and having an exterior wrench engaging means for threading the connector means into the engine opening such that there is a fluid connection with the flexible hose connection end of the conduit means;
retaining means for rotatably holding the conduit means and connector means together; and
seal means between the exterior surface of the conduit means and the interior surface of the connector means.

The present invention further relates to the method of mounting a threaded coupling to a mating threaded opening on an engine, wherein the coupling is located in a position on the engine which does not allow unrestricted rotational movement of the coupling during mounting the improvement which comprises:
providing a coupling which comprises conduit means adapted for connection to flexible hose at one end and having a cylindrical exterior surface at the other end; connector means having a cylindrical interior surface adapted for a precision rotational fit to the exterior surface of the conduit means, the connector means having an exterior threaded surface adapted to fit a mating threaded opening in an engine and having an exterior wrench engaging means for threading the connector means into the engine opening such that there is a fluid connection with the flexible hose connection end of the conduit means; retaining means for rotatably holding the conduit means and connector means together; and seal means between the exterior surface of the conduit means and the interior surface of the connector means.
rotating the connector means into the engine opening with the conduit means being restricted as to movement relative to the connector means.

SPECIFIC DESCRIPTION

Figure 1:
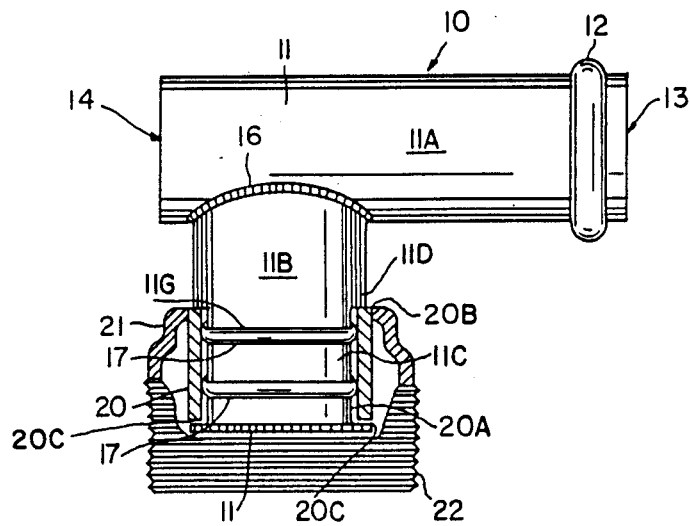
FIG. 1 is a front view in partial cross-section showing a threaded (22) housing (21) with a bushing (20) forming a connector means for threading into a mating opening in an engine and an L-shaped conduit means (11), which allows connection of flexible cooling fluid hoses, having a lip (11E) adjacent the bushing (20) for holding the conduit means (11) and bushing (20) together.
Figure 2:
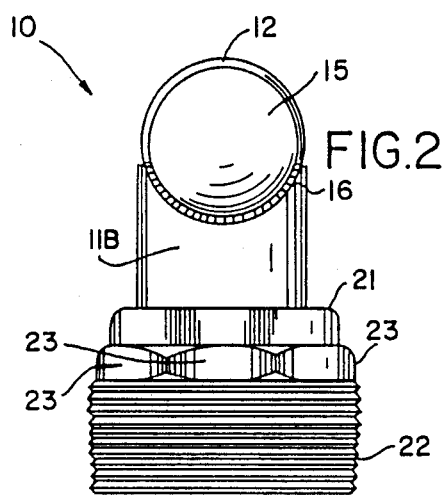
FIG. 2 is a right end view of FIG. 1.

Referring to FIGS. 1 and 2, the preferred form of the coupling 10 of the present invention is shown. An L-shaped conduit 11, including first and second sections 11A and 11B, is provided with a stamped circumferential lip 12 at one end 13 adapted to receive a flexible hose and clamp (not shown). Perpendicular to the axis of the first section 11A is provided the axis of second section 11b. The end 14 of section 11A opposite the lip 12 is sealed by cover 15. The sections 11a and 11B are joined together at a union 16 such as by welding or by some other means of securing the sections 11A and 11B together in a leak-proof manner.

The section 11B has a cylindrical exterior surface 11C which is adapted for rotatable sealing engagement with an interior surface 20A of bushing 20. Preferably o-ring seals 17 are provided around the exterior surface 11C. The bushing 20 is securely fastened in a housing 21. The housing 21 is provided with wrench engaging surfaces 23 and exterior threads 22 for threaded connection with a mating opening in an engine. An external shoulder 11D is provided on the second section 11B which bears on a shoulder 20b of bushing 20. A second shoulder 20C on bushing 20 supports a crimped integral extension 11E of the second section 11b so as to hold the conduit means 11 in place in the housing 21. In the construction of FIGS. 1 and 2, the conduit 11 is rotatable around the longitudinal axis of second section 11B in bushing 20 mounted in housing 21.

The coupling 11 construction shown in FIG. 3 is identical to that shown in FIGS. 1 and 2 except that a C shaped snap ring 30 fits into a groove 11F of second section 11b to hold the conduit means 11 and the bushing 20 and housing 21 together. Again there can be rotational movement of the conduit 11 relative to the bushing 20 and housing 21.

In use, the threads 22 on the housing 21 are threaded into a mating threaded opening (not shown) of an engine 100. The conduit 11 can remain in a fixed position against an external surface of the engine 100 while the housing 21 is turned into position using the wrench engaging means 23. As shown in FIG. 4, the coupling 10 housing 21 is mounted on the engine 100 by means of threads 22. The flexible hose 102 and clamp 101 provide the other connection to the coupling 10.

Figure 4A:
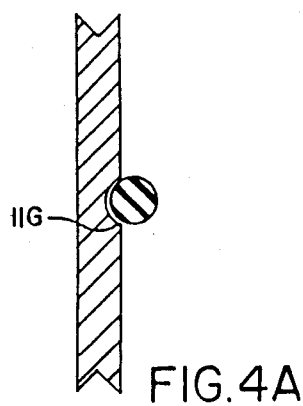
FIGS. 4A and 4B are detailed views of an o-ring 17 and a groove (11g) as shown in FIGS. 1 and 3 before and after mating of the the bushing (20) and exterior cylindrical surface (11C) of conduit means (11).
Figure 4B:
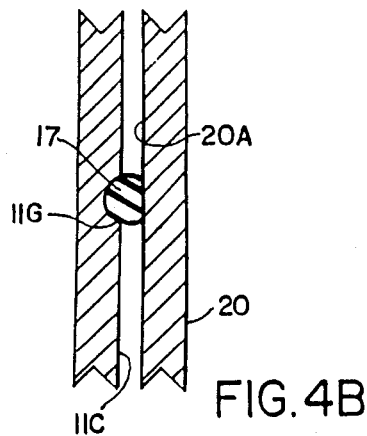

Preferably the o-rings 17 are round in cross-section as shown in FIGS. 4A and are fitted into grooves 11G which are wider than the o-rings 17 along the axis of the second section 11B and extend slightly above the cylindrical surface 11C as shown in FIG. 4A. As shown in FIG. 4B, the pressure of the fluid, shown by the arrow forces the ring into the space between the exterior surface 11C and the interior surface 20a. Other sealing means such as packings and the like could be used; however, the o-rings 17 are preferred.

It was found in dynamic testing on an engine that the coupling 10 was able to survive for 700 hours without leakage at a pressure of 40 to 50 psi and a temperature range of −70° to +600° F. without leakage, except for a few drops initially during seating of the seals 17.

The second section 11B is shown as being machined; however, it could be the exterior surface of a tube. It will be appreciated that the shoulder 11d can be provided by upsetting a lip on the second section 11b (not shown) like lip 12. The housing 21 is preferably die stamped. Preferably at least the surface 20A of bushing 20 is machined. All of these variations will occur to those skilled in the art.

Figure 5:
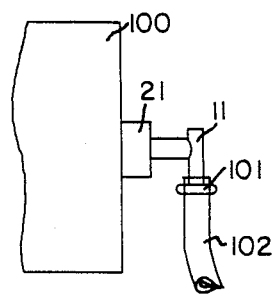

FIG. 5 is a schematic view of the coupling (10) mounted on an engine (100) and connected to a flexible hose (102) by clamp (101).

I claim:

1. A fluid coupling in a motor vehicle engine which comprises:
   (a) tubular conduit means connected to flexible hose supplying fluid to the engine at one end with a clamp adjacent an integral lip and having a cylindrical exterior surface at the other end, wherein the conduit means has an integral outside shoulder intermediate the ends;
   (b) connector means having a housing with a bushing inside the housing secured against movement to and depending from and spaced from the housing which provides a cylindrical interior surface adapted for a precision rotational fit to the exterior surface of the conduit means, the housing having an exterior threaded surface fitted to a mating threaded opening in the engine and having an exterior wrench engaging means for threading the connector means into the engine opening such that there is a fluid connection with the flexible hose connection end of the conduit means, wherein the shoulder on the conduit means abuts on the outside of the connector means;
   (c) retaining means on the other end of the conduit means supporting the connector means for rotatably holding the conduit means and connector means together; and
   (d) seal means between the exterior surface of the conduit means and the interior surface of the connector means.

2. The coupling of claim 1 wherein the conduit means is tubular and L-shaped having two longitudinal axis which are at right angles to each other, one axis for the end for the flexible hose connection and the other axis for the end with the exterior surface.

3. The coupling of claim 1 wherein the retaining means is an integral lip adjacent the exterior cylindrical surface of the conduit means which engages the connector means adjacent the interior cylindrical surface to hold the connector means and conduit means together.

4. The coupling of claim 1 wherein the retaining means is a C shaped snap ring which engages a groove in the conduit means adjacent the exterior surface to hold the connector means and conduit means together.

5. A fluid coupling in a motor vehicle engine which comprises:
   (a) tubular conduit means connected to flexible hose supplying fluid to the engine at one end with a clamp adjacent an integral lip and having a cylindrical exterior surface at the other end, wherein the conduit means has an integral outside shoulder intermediate the ends;
   (b) connector means having housing means with a bushing inside the housing secured against movement to and depending from and spaced from the housing which provides a cylindrical interior surface adapted for a precision rotational fit to the exterior surface of the conduit means, the housing having an exterior threaded surface fitted to a mating threaded opening in the engine and having an exterior wrench engaging means for threading the connector means into the engine opening such that there is a fluid connection with the flexible hose connection end of the conduit means, wherein the shoulder on the conduit means abuts on the outside of the connector means;
   (c) retaining means on the other end of the conduit means supporting the connector means for rotatably holding the conduit means and connector means together; and
   (d) seal means between the exterior surface of the conduit means and the interior surface of the connector means, wherein the seal means is at least one o-ring mounted in a rounded groove on the exterior surface of the conduit means which engages an interior surface of the connector means such that in pressure on the fluid inside the connector means forces the o-ring between the exterior surface of the conduit means and the interior surface of the bushing.

6. The coupling of claim 5 wherein there are two ring seals.

7. The coupling of claim 5 wherein the conduit means is tubular and L-shaped having two longitudinal axis which are at right angles to each other, one axis for the end for the flexible hose connection and the other axis for the end with the exterior surface.

8. The coupling of claim 5 wherein the retaining means is an integral lip adjacent the exterior cylindrical surface of the conduit means which engages the connector means adjacent the interior cylindrical surface to hold the connector means and conduit means together.

9. The coupling of claim 5 wherein the retaining means is a C shaped snap ring which engages a groove in the conduit means adjacent the exterior surface to hold the connector means and conduit means together.

* * * * *